United States Patent [19]

Psarouthakis

[11] 4,423,752
[45] Jan. 3, 1984

[54] ANTI-SCALD MIXING VALVE

[75] Inventor: John Psarouthakis, Ann Arbor, Mich.

[73] Assignee: J. P. Industries, Inc., Ann Arbor, Mich.

[21] Appl. No.: 218,484

[22] Filed: Dec. 22, 1980

[51] Int. Cl.³ .............................................. F16K 11/06
[52] U.S. Cl. ............................ 137/625.41; 251/288; 137/270
[58] Field of Search ................. 137/625.41, 625.47, 137/270, 625.4; 251/288

[56] References Cited

U.S. PATENT DOCUMENTS

| | | | |
|---|---|---|---|
| 3,422,849 | 1/1969 | Manoogian | 137/625.41 |
| 3,476,149 | 11/1969 | Dornaus | 137/625.4 |
| 3,674,048 | 7/1972 | Manoogian | 137/625.41 X |
| 4,243,063 | 1/1981 | Parkison | 137/625.12 X |

FOREIGN PATENT DOCUMENTS 246944 3/1926 Italy ................. 137/625.41

*Primary Examiner*—Arnold Rosenthal
*Attorney, Agent, or Firm*—Stephenson and Boller

[57] ABSTRACT

A mixing valve adapted for proportioning hot and cold water and for initiating and terminating flow. The valve body has fluid passages terminating in spaced apart hot and cold water inlet ports and an outlet port to a circular valve seat. A generally cylindrical closure member is rotatable about its axis within the valve body with one end overlying the valve seat so as to cover and seal the inlet ports in a closed position. The closure member has a particularly configured recess such that upon rotation of the closure member from the closed position the recess progressively overlies and seals the inlet ports to initiate and provide a mixing of flow. A sequence of flow from cold to warm to hot is assured by a stop which is adjustable to preset a maximum temperature of outlet flow. The closure member can be easily modified for installations where the hot and cold water inlet pipes are reversed from their conventional relative positions.

8 Claims, 9 Drawing Figures

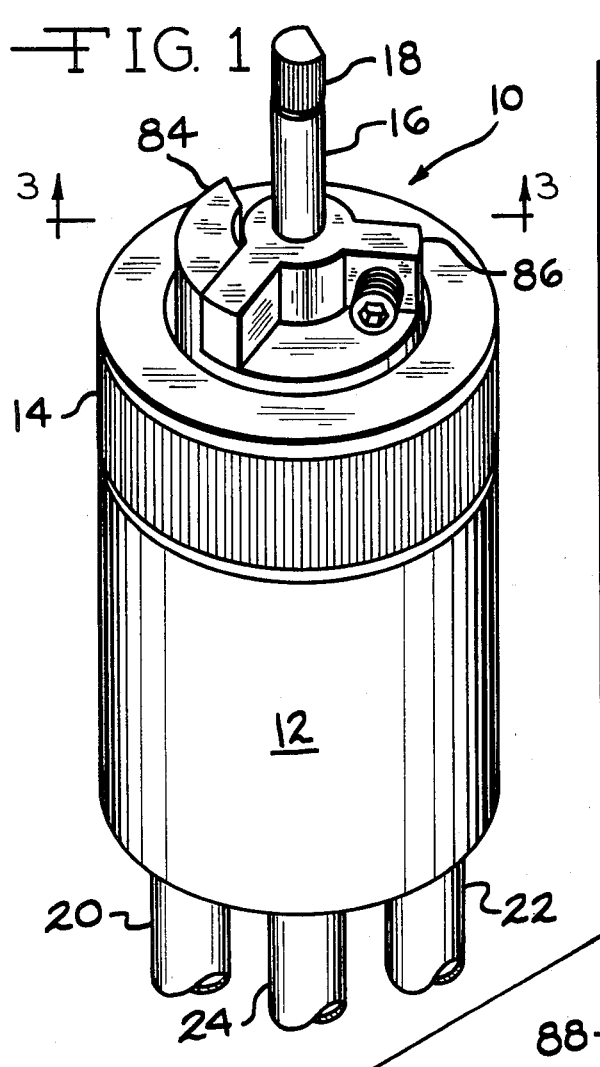
FIG. 1
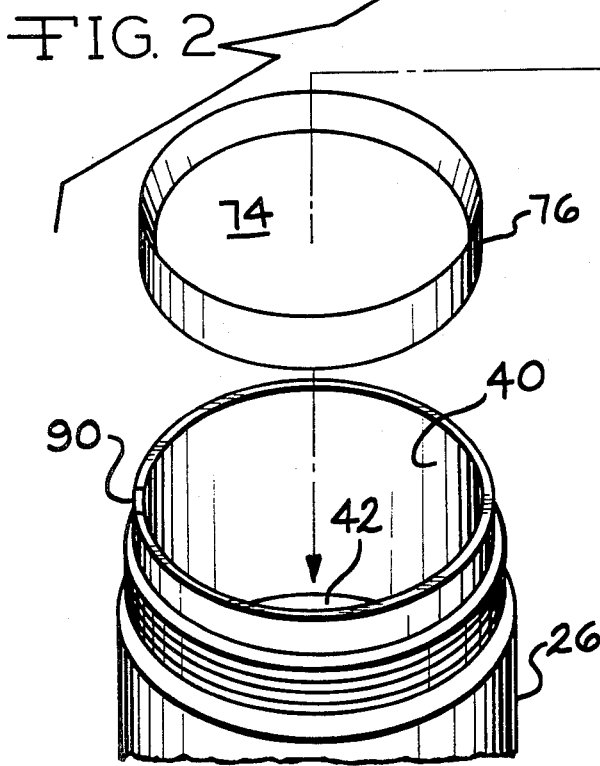
FIG. 2
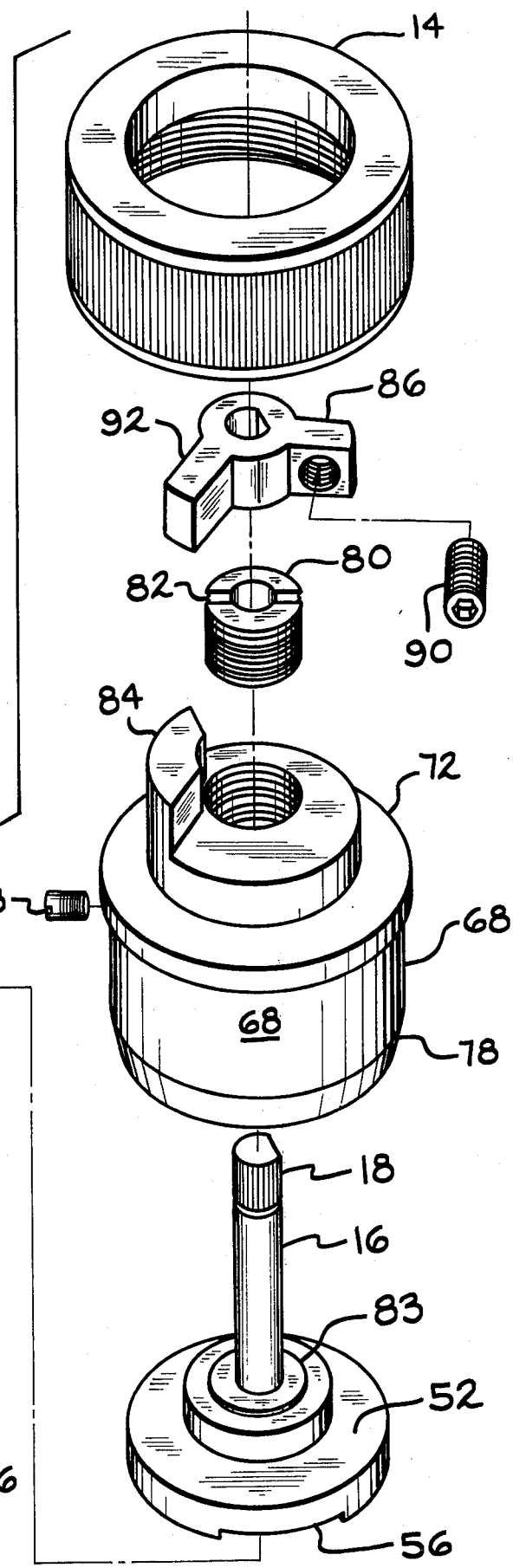

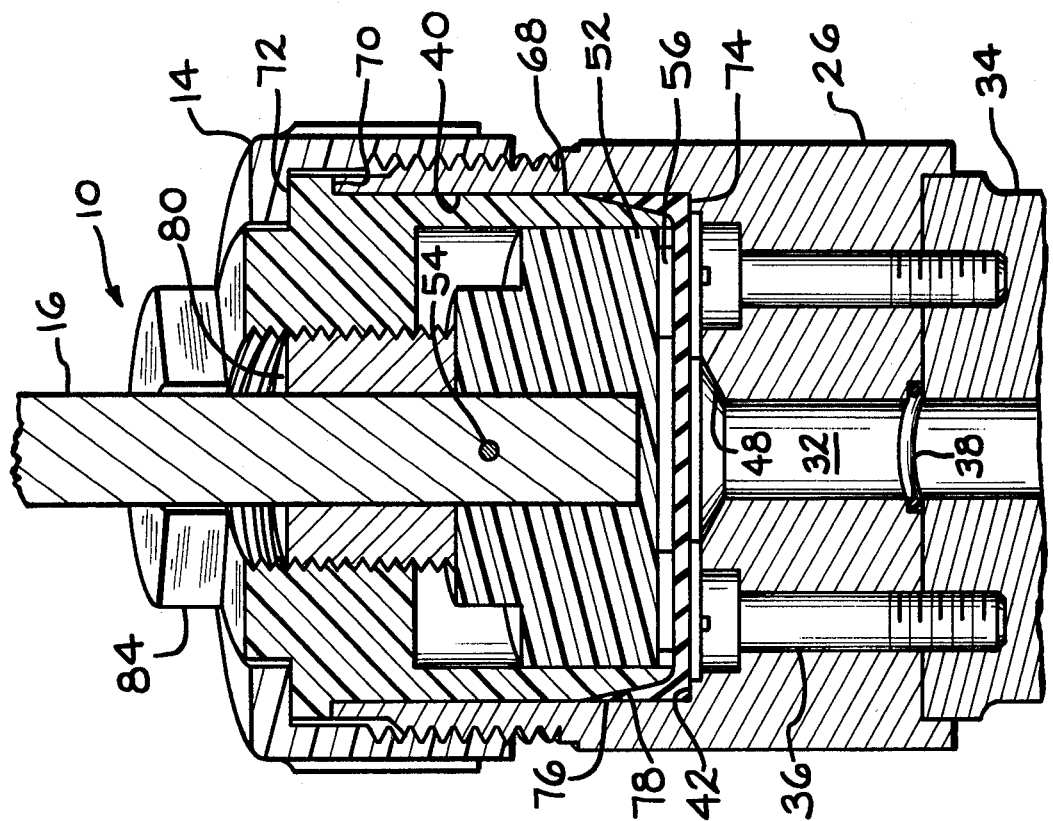
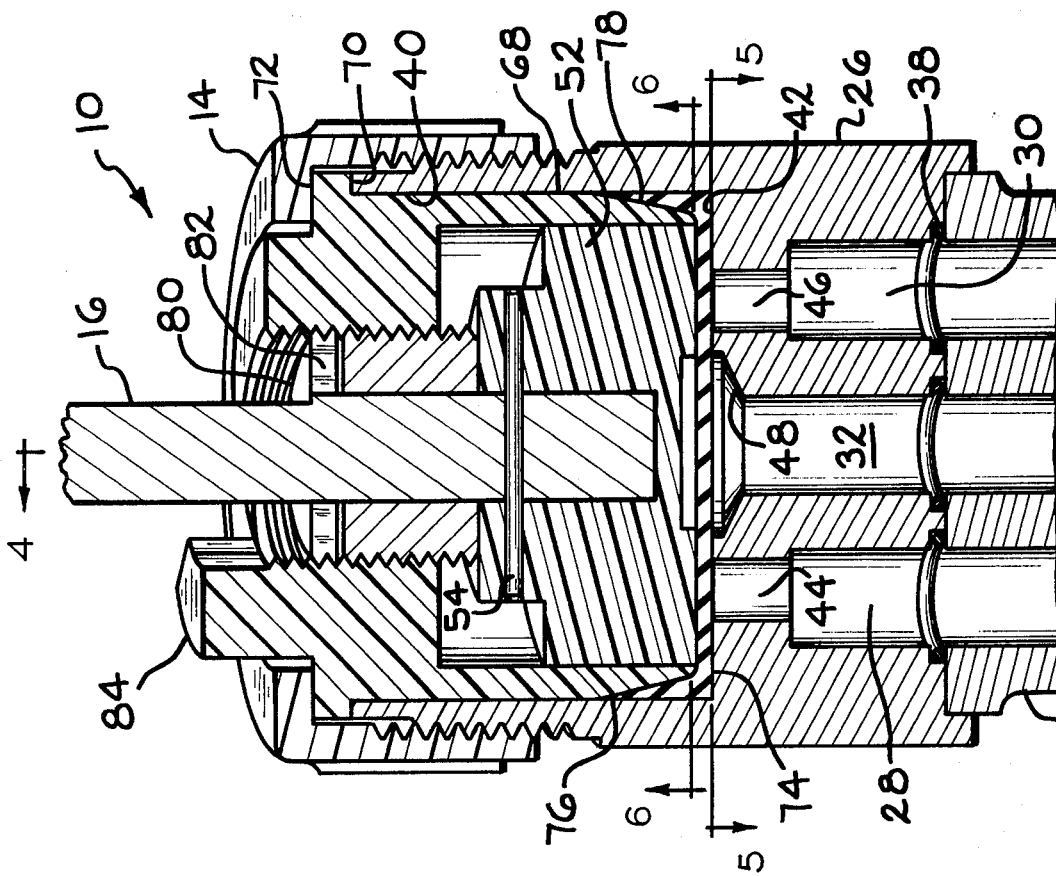

ANTI-SCALD MIXING VALVE

BACKGROUND OF THE INVENTION

1. Field of the Invention

The present invention relates to a mixing or proportioning valve and, more particularly, to a cylindrical-type single lever valve adapted for mixing or proportioning hot and cold water and for initiating and terminating the flow.

2. Description of the Prior Art

Many mixing devices have been developed to avoid the disadvantages of utilizing separate hot and cold water taps to control water temperature and to initiate and terminate flow. These devices permit control of the flow as well as the setting of the proportion of hot and cold water, and they can be provided with predetermined markings to indicate the approximate proportion of hot and cold water. Various refinements have been added, including the addition of liner members and flexible diaphrams to improve the sealing between the valve elements and to extend the operating life of the mixing valve.

One problem inherent in many prior art mixing devices is the danger associated with the accidental flow of hot water. With the common ball-type single lever mixing valves, for example, there is the possibility that the initial flow will be too hot. Further, the prior art devices do not have a convenient means to permit the setting of a maximum temperature. Another problem is the unsuitability of many prior art mixing devices for operation with hot and cold water inlet pipes which are reversed from their conventional relative positions. In applications such as adjacent apartments with adjoining bathrooms, the pipes of one bathroom must be crossed before the prior art devices can be installed. Additionally, many prior art mixing devices are not self-sealing and, therefore, require the installation of an additional on-off valve to initiate and terminate the flow.

Accordingly, it is an object of the present invention to provide an improved single lever mixing valve which is self-sealing and which permits the initiation of flow only with cold water. It is a further object of the present invention to provide a mixing valve which can be converted for use with reversed hot and cold water inlet pipes and which has a stop means which can be easily adjusted to preset a maximum temperature of the outlet flow.

SUMMARY OF THE INVENTION

The present invention is a mixing valve which comprises a body, a cylindrical closure member, and a means for moving the closure member between closed and open positions. The body has two inlet passages and an outlet duct which terminate in two spaced apart inlet ports and an outlet port to a circular valve seat disposed therein. The closure member is rotatable about its axis and is fitted within the body with one end overlying the valve seat so as to normally cover and seal the inlet ports and prevent flow from the inlet ports to the outlet port in a closed position.

The closure member has a recess such that upon rotation of the closure member from the closed position through a continuum of open positions the recess progressively and selectively overlies the inlet ports to provide a mixing of flow varying from flow only from a first of the inlet ports to flow only from the second inlet port. In each of these open positions, the recess overlies the outlet port to provide fluid communication between the outlet port and one or both inlet ports. The sequence of the flow is assured by a stop means on the closure member which may be adjustable to permit presetting of a maximum temperature so as to prevent scalding when the first inlet passage carries cold water and the second inlet passage carries hot water. The mixing valve can be converted for use in applications where the hot and cold water pipes are reversed from their conventional relative positions by the substitution of a different closure member element. Alternatively, if the preferred configuration is utilized, the mixing valve can be assembled with the original closure member merely rotated 180° to convert the mixing valve to this reversed mode of operation.

As a result of the present invention, the convenience of a single lever mixing valve adapted for proportioning the mixture of hot and cold water can be realized without the disadvantages of the prior art. Because the mixing valve of the present invention is self-sealing and assures that only cold water flow will be initiated from the closed position, there is no possibility that the initial flow will be too hot. The mixing valve can be easily converted for use with reversed hot and cold water inlet pipes either by substituting a replaceable element of the mixing valve or by reversing the position of the closure member. Additionally, an adjustable stop means can be used to preset a maximum temperature so as to prevent scalding.

Further objects, features, and advantages of the present invention will become apparent from a consideration of the following description, the appended claims, and the accompanying drawings.

BRIEF DESCRIPTION OF THE DRAWINGS

FIG. 1 is a perspective view of the assembled mixing valve of the present invention as it would appear in a shower or tub installation;

FIG. 2 is an exploded view of the mixing valve of the present invention;

FIG. 3 is a sectional view of the mixing valve taken along the line 3—3 of FIG. 1;

FIG. 4 is a sectional view of the mixing valve taken along the line 4—4 of FIG. 3;

DESCRIPTION OF THE PREFERRED EMBODIMENT

Figure 5:
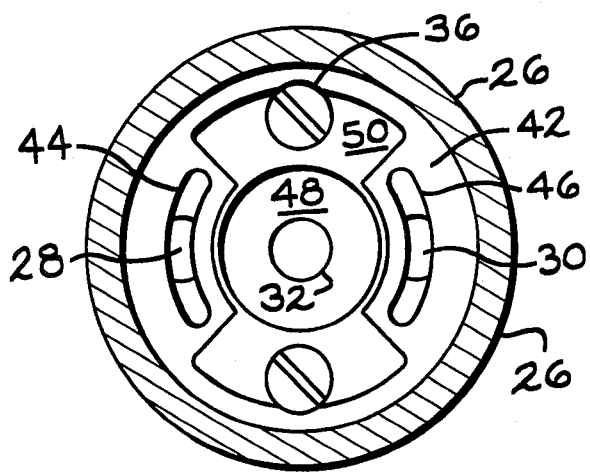
FIG. 5 is a sectional view showing the upper surface of the valve seat of the mixing valve taken along the line 5—5 of FIG. 3.

With reference to the drawing, the mixing valve of the present invention, indicated generally at 10, is illustrated in FIG. 1 as it would appear in a tub or shower installation. The outwardly visible components include a decorative cylindrical sleeve 12 which is shown in a vertical position and a vertically knurled end cap 14 of similar diameter which is aligned coaxially adjacent the upper surface of the sleeve 12. An upwardly extending stem 16 coaxial with the sleeve 12 protrudes through the end cap 14 and is adapted with splines 18 to receive a control handle, not shown. Hot and cold water inlet tubes 20 and 22, respectively, and an outlet tube 24 protrude from the bottom of the cylindrical sleeve 12.

As is shown in FIGS. 3 and 4, the mixing valve includes a substantially cylindrical body member 26 which is positioned just within and concentric with the cylindrical sleeve 12. In its lower end, the body member 26 is provided with cylindrical hot and cold water inlet passages 28 and 30, respectively, and an outlet duct 32 which connect with similar passages in a conventional base 34 upon which the body member 26 is mounted by two panhead machine screws 36. The juncture between the body member 26 and the base 34 is provided with three O-rings 38 which reside in complementary circumferential grooves to provide a fluid-tight seal of the inlet passages 28 and 30 and the outlet duct 32.

In its upper end, the body member 26 is provided with a cylindrical opening 40 concentric with the external cylindrical surface of the body member 26 which serves as a valve cavity having a substantially disc-shaped valve seat 42. The inlet passages 28 and 30 terminate in diametrically opposite hot and cold water inlet ports 44 and 46, respectively, to the valve seat 42. The inlet ports 44 and 46 are narrower than the diameter of the inlet passages 28 and 30, as shown in FIG. 3, but are elongated so as to extend circumferentially beyond the inlet passages as shown in FIG. 5. The outlet duct 32 flares outward to form a centrally located round outlet port 48 to the valve seat 42. Two similarly shaped arc portions 50 extend radially from the outlet port 48 and are equally spaced between the inlet ports 44 and 46 as shallow cavities in the surface of the valve seat 42. These two arc portions 50 form a fluid passage to the outlet duct 32 and assist in mixing the hot and cold water flow.

Figure 6:
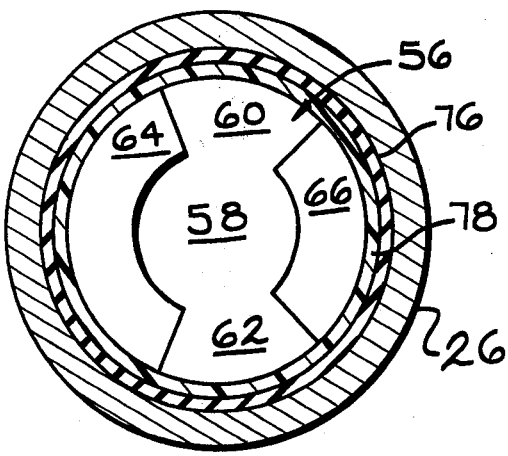
FIG. 6 is a sectional view showing the bottom surface of the closure member of the mixing valve taken along the line 6—6 of FIG. 3.

A generally cylindrical closure member 52 is positioned within the cylindrical opening 40 concentric with the body member 26 such that the lower end of the closure member overlies the valve seat 42. The closure member 52 is secured to the stem 16 by a retaining pin 54 which is pressfit through the two elements. The bottom surface of the closure member 52 has a shallow recess generally indicated 56 in FIG. 6. The recess 56 includes a substantially round central portion 58 and two similarly shaped arc portions 60 and 62 which extend radially therefrom. Unlike the arc portions 50 of the valve seat, the arc portions 60 and 62 of the closure member are not positioned diametrically opposite with respect to the circular valve seat. This placement of the arc portions 60 and 62 results in a longer proud portion 64 which is diametrically opposite a relatively shorter proud portion 66.

The closure member 52 is slidably mounted within a sleeve 68 which is secured to the upper end of the body member 26 by means of the end cap 14. The sleeve 68 is provided with an outwardly extending flange 70 to engage the upper end surface of the body member 26 so as to properly position the sleeve 68 longitudinally with respect to the valve seat 42. The end cap 14 engages a complementary shoulder on the upper end of the sleeve 68 so as to maintain the axial alignment of the sleeve 68 and to give a flush appearance to the mixing valve 10. Internal threads on the end cap 14 engage external threads cut in the upper end of the body member 26 to secure the elements of the mixing valve longitudinally and to permit access to the internal parts thereof.

A flexible diaphram 74 is positioned between the valve seat 42 and the closure member 52. The flexible diaphram 74 has a disc-shaped main portion of substantially uniform thickness and upwardly extending side wall portions 76 which are tapered outwardly and upwardly to a reduced thickness. A complementary inwardly tapered sleeve portion 78 engages the side wall portions 76 and wedges them outward against the cylindrical opening 40 of the body member 26 to provide a fluid-tight seal.

A pressure adjustment screw 80 is threadably mounted in the upper end of the sleeve 68 for axial movement with respect to the body member 26. The pressure adjustment screw 80 has a central bore to permit sliding movement of the stem 16 therein and has a slot 82 at its upper end to permit it to be advanced by a blade screwdriver or wrench. Advancement of the pressure adjustment screw 80 against the closure member 52 moves the closure member closer to the valve seat 42 and compresses the flexible diaphram 74 between those elements to ensure proper sealing of the hot and cold water inlet ports. An optional stainless steel washer 83, as shown in FIG. 2, may be placed between the pressure adjustment screw 80 and the upper surface of the closure member 52 to facilitate sliding movement between those elements.

A cam stop 84 is formed on the upper surface of the sleeve 68 to interact with an adjustable cam 86 mounted on the stem 16 so as to limit the range of rotation of the closure member 52. An alignment screw 88 is threaded into the circumferential surface of the sleeve 68 so as to protrude into an alignment notch 90 in the upper end of the body member 26 to prevent rotation of the sleeve relative to the body member. Complemenary flat portions of the adjustable cam 86 and the stem 16 prevent rotation of the cam about the stem to ensure positive control over the rotation of the closure member 52. An anti-scald adjustment screw 90 can be threadably advanced through the adjustable cam 86 to further limit rotation of the closure member 52. As will be noted below, a rotation of less than 180° is sufficient to effect a full range of outlet flow temperatures between those of the hot and cold water inlets.

Figure 7:
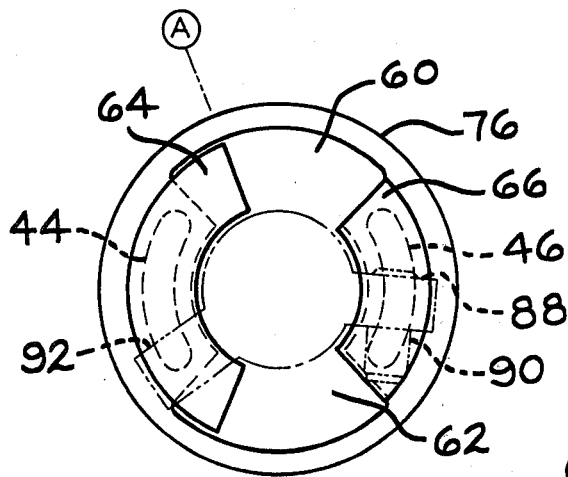
FIGS. 7-9 are bottom views of selected elements of the mixing valve corresponding to selected closed and open positions.
Figure 8:
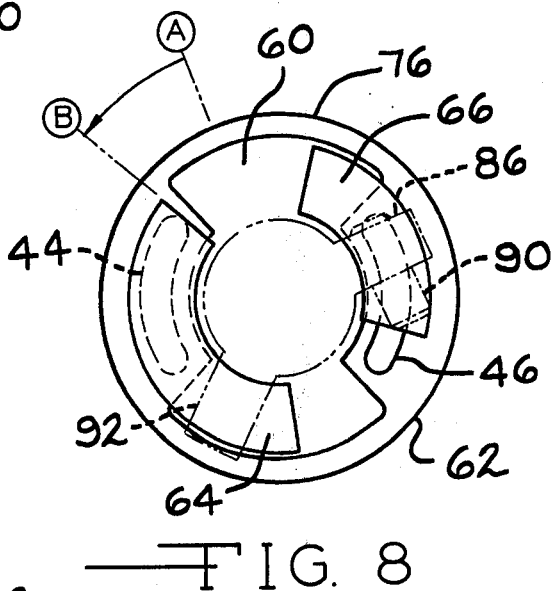
Figure 9:
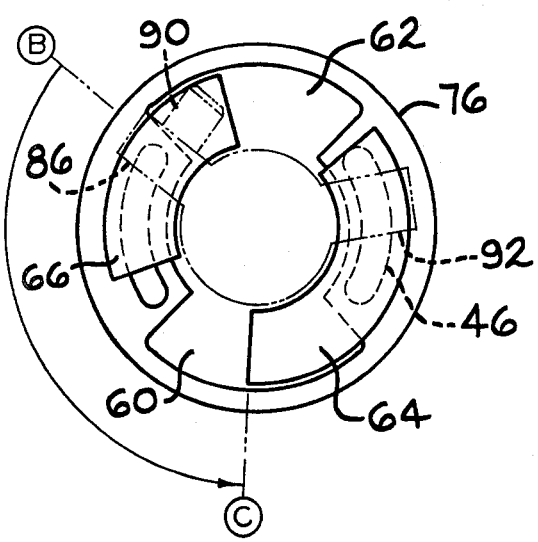

The operation of the mixing valve is shown in FIGS. 7-9. In FIG. 7, the position of the recess area 56 of the closure member 52 is shown in the closed position. It will be noted that the longer proud portion 64 of the closure member 52, one end of which is indicated by the reference letter A, overlies and seals the inlet port 44 and that the shorter proud portion 56 of the closure member 52 overlies and closes the cold water inlet port 46. The position of the adjustable cam 86 is shown in phantom. A non-adjustable wing 92 of the cam 86 abuts the cam stop 84 to prevent further clockwise motion of the closure member 52 so as to ensure that the hot water inlet port 44 is not opened before the cold water inlet port 46.

In FIG. 8, the closure member 52 has been rotated to an open position in which the longer proud portion 64 continues to overlie and seal the hot water inlet port 44 and in which the shorter proud portion 66 overlies and seals only a portion of the cold water inlet port 46. It will be noted that as the longer proud portion 64 is rotated from the position indicated by the letter A to the position indicated by the letter B, the mixing valve initially and progressively permits a flow of cold water when being moved from the closed position. In these positions, the flexible diaphram 7 resiliently deforms under the pressure of the cold water into the portions 58 and 62 of the recess area 56 to provide a fluid passage between the cold water inlet port 46 and the outlet port 48.

In FIG. 9, the longer proud portion 64 of the closure member 52 has been rotated to a position indicated by the letter C in which it overlies and completely seals the cold water inlet port 46. It will be noted that in rotating the proud portion 64 from the position indicated by the letter B to the position indicated by the letter C, both the hot water inlet port 44 and the cold water inlet port 46 are open in varying proportions to permit a gradual increase in temperature of the outlet flow from that of the incoming cold water to that of the incoming hot water. In order to limit the maximum temperature obtainable with the mixing valve, the anti-scald adjustment screw 90 may be advanced with respect to the adjustable cam 86 so as to abut the cam stop 84 and thereby terminate rotation of the closure member 52 before the position indicated by the letter C is reached. In this way, the cold water inlet port 46 will not be completely sealed by the proud portion 64 of the closure member 52 but will permit a limited amount of cold water to mix with the hot water from the inlet port 44 so as to moderate the temperature and prevent scalding of a person using the mixing valve.

It will be seen from FIGS. 7-9 that the sequence of flow can be reversed by rotating the closure member 52 through an angular displacement of 180°. Due to the means of assembly previously described, this rotation can easily be accomplished by pressing out the retaining pin 54 and reinserting it after reversing the closure member 52 relative to the flat portion of the stem 16. This simple modification of the mixing valve 10 adapts it for use in applications where the hot and cold water pipes are reversed from their conventional relative positions and permits the use of the same handle positions and markings as with the normal installation. If the hot and cold water inlet ports 44 and 46 are not positioned diametrically opposite a central outlet port 48 as shown in the preferred embodiment, the conversion to a reversed mode of operation can be effected by a substitution of a different closure member 52 having a modified configuration of the recess 56.

From the above description of the preferred embodiment, it can be seen that the present invention provides an improved mixing valve with anti-scald features and convertibility not present in the prior art devices. The mixing valve of the present invention ensures that when the valve is opened from a closed position the initial flow will be of cold water. The mixing valve permits a maximum temperature to be easily preset by means of an adjustable stop. By reversing an internal valve element or be substituting a new valve element, the mixing valve can be easily converted for use in applications where the hot and cold water inlet pipes are reversed from their conventional relative positions.

While the preferred embodiment has been described in considerable detail, the present invention is not to be limited to such detail except as may be necessitated by the appended claims.

What is claimed is:

1. A mixing valve comprising:
    a body having two inlet passages, an outlet duct, and a valve cavity including a generally circular valve seat disposed therein with the outlet duct and the inlet passages terminating in an outlet port and two spaced inlet ports to said valve seat,
    a generally cylindrical closure member rotatable about its axis and fitted within said body, said closure member having one end surface overlying said valve seat so as to normally cover and seal said inlet ports and prevent flow through said valve in a closed position,
    said closure member end surface having a recess formed therein and located such that upon rotation of said closure member from said closed position through a continuum of open positions said recess progressively and selectively overlies said inlet ports to provide a mixing of flow through said valve varying from flow only from a first of said inlet ports to flow only from the second of said inlet ports, said recess overlying said outlet port in each of said open positions to provide fluid communication between said outlet port and said inlet ports and to provide mixing of fluid when both said inlet ports are open simultaneously, a flexible diaphram member positioned between said closure member and said valve seat to enhance sealing between said closure member and said valve seat, said diaphram member being resiliently deformable into said recess in response to pressure of fluid in said inlet passages in said open positions, and
    means for rotating said closure member about its axis between said closed and open positions.

2. A mixing valve as defined in claim 1 which further comprises stop means on said closure member coacting with said body for ensuring that rotation of said closure member is restricted to a sequence in which said first inlet port is opened before said second inlet port.

3. A mixing valve as defined in claim 2 which further comprises adjustment means on said stop means for adjustably stopping rotation of said closure member in positions corresponding to predetermined proportions of fluids from said inlet ports so as to permit presetting of a maximum temperature and to prevent scalding when said first inlet passage carries cold water and said second inlet passage carries hot water.

4. A mixing valve as defined in claim 2 wherein said closure member can be assembled in a "reversed" closed position such that said closure member is restricted to a sequence in which said second inlet port is opened before said first inlet port.

5. A mixing valve as defined in claim 4 wherein said inlet ports are diametrically opposed with respect to said valve seat and wherein said "reversed" closed position of said closure member is 180° rotation of said closure member about its axis from said normal closed position.

6. A mixing valve as defined in claim 1 wherein said outlet port is centrally located in said circular valve seat and said inlet ports are spaced radially from said outlet port and wherein said recess includes two channels extending radially from said outlet port so as to progressively overly said inlet ports in said open positions,
    said channels being sufficiently offset with respect to said inlet ports such that upon initial rotation of said closure member from said closed position a first of said channels overlies a portion of said first inlet port before the second of said channels overlies a portion of said second inlet port,
    said channels being spaced apart by a divider portion of said closure member such that upon further rotation of said closure member said divider portion progressively covers and seals said first inlet port while said second channel overlies a portion of said second inlet port.

7. A mixing valve as defined in claim 6 wherein said closure member can be assembled in a "reversed" closed position such that upon initial rotation of said closure member said first channel overlies a portion of said second inlet port before said second channel overlies a portion of said first inlet port and such that upon further rotation said divider portion progressively covers and seals said second inlet port while said second channel overlies a portion of said first inlet port.

8. A mixing valve as defined in claim 1 in which said diaphragm member is secured to said closure member and includes an annular sleeve portion which extends about an end portion of said closure member adjacent said valve seat.

* * * * *